(12) United States Patent
Tysowski (10) Patent No.: US 9,164,175 B2
(45) Date of Patent: Oct. 20, 2015

(54) WIRELESS COMMUNICATIONS SYSTEM PROVIDING NOTIFICATION-BASED MOBILE DEVICE NAVIGATION FEATURES AND RELATED METHODS

(75) Inventor: Piotr K. Tysowski, Waterloo (CA)

(73) Assignee: BlackBerry Limited, Waterloo (CA)

(*) Notice: Subject to any disclaimer, the term of this patent is extended or adjusted under 35 U.S.C. 154(b) by 918 days.

(21) Appl. No.: 12/394,120

(22) Filed: Feb. 27, 2009

(65) Prior Publication Data

US 2010/0222078 A1    Sep. 2, 2010

(51) Int. Cl.
| | |
|---|---|
| H04W 24/00 | (2009.01) |
| G01S 19/14 | (2010.01) |
| G01C 21/36 | (2006.01) |
| G06Q 30/02 | (2012.01) |
| H04W 4/18 | (2009.01) |
| H04W 4/20 | (2009.01) |
| H04W 4/02 | (2009.01) |

(52) U.S. Cl.
CPC .............. G01S 19/14 (2013.01); G01C 21/3682 (2013.01); G06Q 30/02 (2013.01); H04W 4/18 (2013.01); H04W 4/206 (2013.01); *H04W 4/02* (2013.01)

(58) Field of Classification Search
CPC ... G01S 19/14; G01S 5/0027; G01C 21/3682; G06Q 30/02; G06Q 10/08; H04W 4/02; H04W 4/18; H04W 4/206; H04L 67/18
USPC ........ 455/456.3, 435.1, 466, 413, 406, 435.2, 455/456.2, 425, 560; 340/436, 438, 8.1; 342/457; 709/202, 203; 370/428, 429; 701/207, 213
See application file for complete search history.

(56) References Cited

U.S. PATENT DOCUMENTS

| | | | |
|---|---|---|---|
| 6,208,996 | B1* | 3/2001 | Ben-Shachar et al. ................. 1/1 |
| 8,539,359 | B2* | 9/2013 | Rapaport et al. .............. 715/751 |
| 2001/0052849 | A1* | 12/2001 | Jones, Jr. ................... 340/572.1 |
| 2003/0036848 | A1* | 2/2003 | Sheha et al. .................. 701/209 |
| 2003/0115098 | A1 | 6/2003 | Kang ............................... 705/14 |
| 2003/0195696 | A1* | 10/2003 | Jones ........................... 701/201 |
| 2004/0148402 | A1* | 7/2004 | Sato .............................. 709/227 |
| 2008/0139181 | A1* | 6/2008 | Lokshin ..................... 455/414.1 |
| 2008/0183573 | A1* | 7/2008 | Muschetto ...................... 705/14 |
| 2010/0088149 | A1* | 4/2010 | Sullivan et al. ................. 705/10 |

FOREIGN PATENT DOCUMENTS

| | | |
|---|---|---|
| CN | 1692671 | 11/2005 |
| WO | 2004034725 | 4/2004 |

* cited by examiner

*Primary Examiner* — Mahendra Patel
(74) *Attorney, Agent, or Firm* — Donna Flores, Esq.; Steven Greenberg, Esq.; CRGO Law (57) ABSTRACT

A wireless communications system may include a notification server and at least one mobile wireless communications device. The at least one mobile wireless communications device may include an output device, a position determining device, and a processor. The processor may be configured to obtain at least one notification from the notification server, determine a current location based upon the position determining device, and output the at least one notification via the output device. The processor may also be configured to selectively output navigation information for a route from the current location to a destination location via the output device based upon the at least one notification being output.

24 Claims, 7 Drawing Sheets

WIRELESS COMMUNICATIONS SYSTEM PROVIDING NOTIFICATION-BASED MOBILE DEVICE NAVIGATION FEATURES AND RELATED METHODS

TECHNICAL FIELD

The present disclosure relates to the field of communications systems, and, more particularly, to mobile wireless communications systems and related methods.

BACKGROUND

Mobile communications systems continue to grow in popularity and have become an integral part of both personal and business communications. Mobile telephones allow users to place and receive voice calls most anywhere they travel. Moreover, as mobile telephone technology has increased, so too has the functionality of mobile devices and the different types of devices available to users. For example, many mobile devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

As a result, users continue to spend more time using their mobile devices during the course of a day performing information searches, reading emails, etc., as opposed to early cellular phones that were used only for phones calls. This has resulted in a significant interest from the advertising community in targeting advertisements to mobile devices.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a notification (e.g., advertising) server and at least one mobile wireless communications device. The at least one mobile wireless communications device may include an output device, a position determining device, and a processor. The processor may be configured to obtain at least one notification (e.g., advertisement) from the advertising server, determine a current location based upon the position determining device, and output the at least one advertisement via the output device. The processor may also be configured to selectively output navigation information for a route from the current location to a destination location via the output device based upon the at least one advertisement being output.

More particularly, the output device may include a display. As such, the processor may further display a point-of-interest (POI) icon corresponding to the at least one advertisement on the display with the navigation information. Also, the mobile device may further include an input device, and the POI icon may be selectable based upon the input device. Furthermore, the processor may update the navigation information to include a location associated with the POI icon based upon selection thereof.

The processor may selectively output the navigation information based upon an acknowledgement of the at least one advertisement provided via the input device. Moreover, the processor may output the at least one advertisement at a recurring time interval for acknowledgement. In some embodiments, the output device may include an audio output device. As such, the navigation information may include audio navigation information, and the at least one advertisement may include at least one audio advertisement. The processor may therefore selectively output the audio navigation information via the audio output device based upon the at least one audio advertisement being output at a volume level above a threshold level.

In addition, the at least one advertisement may include a plurality of different advertisements, and at least one of the advertising server and the processor may select the advertisements for outputting based upon the current location. Furthermore, at least one of the advertising server and the processor may also select the advertisements for outputting based upon a user preference profile associated with the at least one mobile wireless communications device.

The navigation information may include road intersection information, for example. Accordingly, the processor may advantageously not output the at least one advertisement while the at least one mobile wireless communications device is moving and within a given distance of an intersection. Also by way of example, the processor may output the at least one advertisement on the display while the at least one mobile wireless communications device is moving at a speed below a speed threshold. The at least one mobile wireless communications device may also include a wireless transceiver cooperating with the processor for receiving the at least one advertisement from the advertising server.

A mobile wireless communications device, such as the one discussed briefly above, and a related wireless communications method for use with such a mobile wireless communications device are also provided. The method may include providing at least one advertisement from the advertising server to the at least one mobile wireless communications device, determining a current location of the at least one mobile wireless communications device based upon the position determining device, and outputting at least one advertisement via the output device. The method may further include selectively outputting navigation information for a route from the current location to a destination location via the output device based upon the at least one advertisement being output.

A related computer-readable medium may have computer-executable instructions (or modules) for causing a mobile wireless communication device, such as the one described briefly above, to perform steps including obtaining at least one advertisement from an advertising server, determining a current location based upon the position determining device, and outputting at least one advertisement via the output device. The steps may further include selectively outputting navigation information for a route from the current location to a destination location via the output device based upon the at least one advertisement being output.

Figure 1:
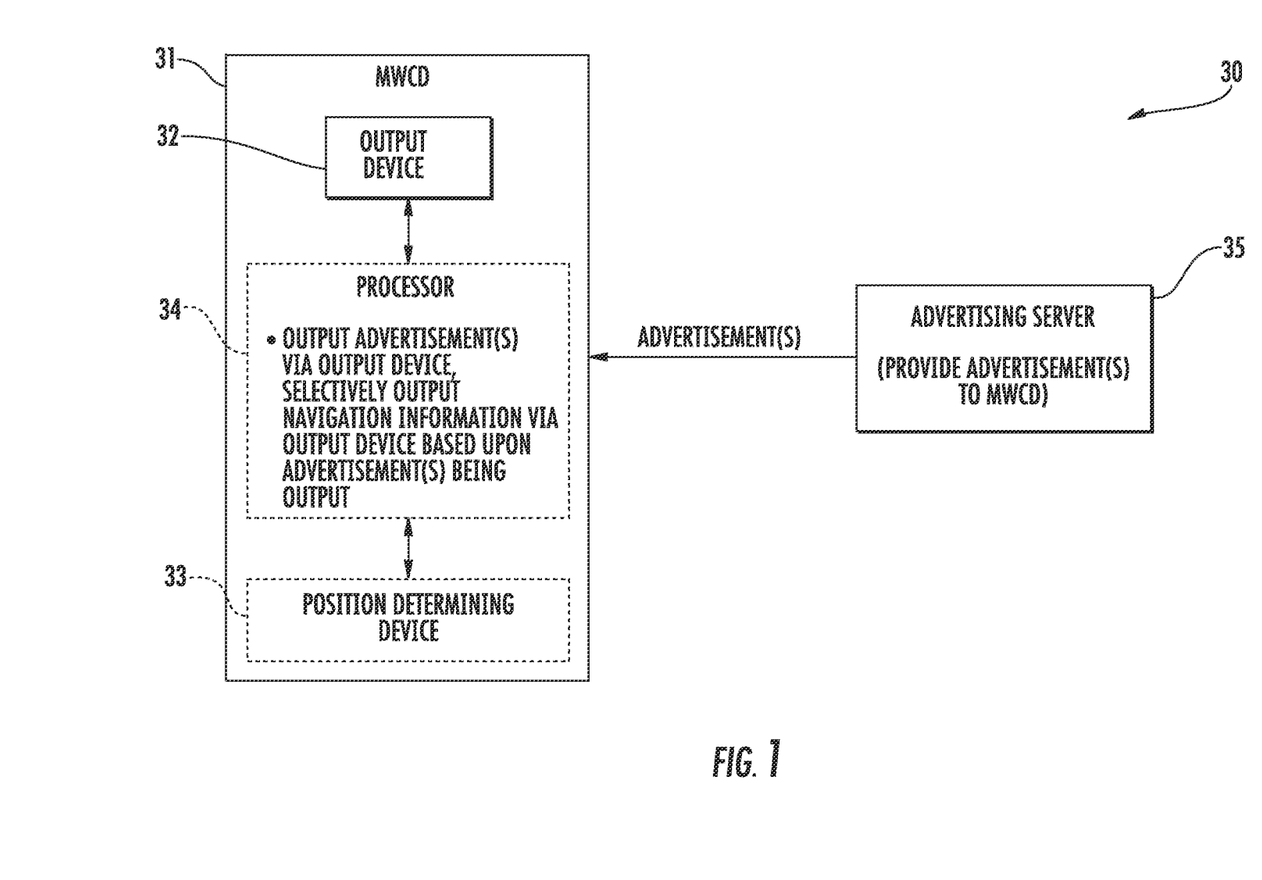
FIG. 1 is a schematic block diagram of a wireless communications system in accordance with one exemplary embodiment providing mobile advertising with a navigation application.

Referring initially to FIG. 1, a wireless communications system 30 is first described. The system 30 illustratively includes one or more mobile wireless communications devices 31 (MWCDs), which includes an output device 32, a position determining device 33, and a processor 34. By way of example, the position determining device 33 may be a Global Positioning System (GPS) device, although other suitable types of position determining devices may also be used, such as the Russian Global Navigation Satellite System (GLONASS), the European Galileo positioning system, the COMPASS navigation system of China, IRNSS of India, or DORIS of France, for example, as well as ground-based position determining systems, as will be appreciated by those skilled in the art. In addition, the processor 34 may be implemented using a combination of hardware and software components, including a microprocessor, memory, etc., for example, as will also be appreciated by those skilled in the art. The system 30 further illustratively includes an advertising server 35 for providing advertisements to the mobile device 31, as will be discussed further below.

Figure 2:
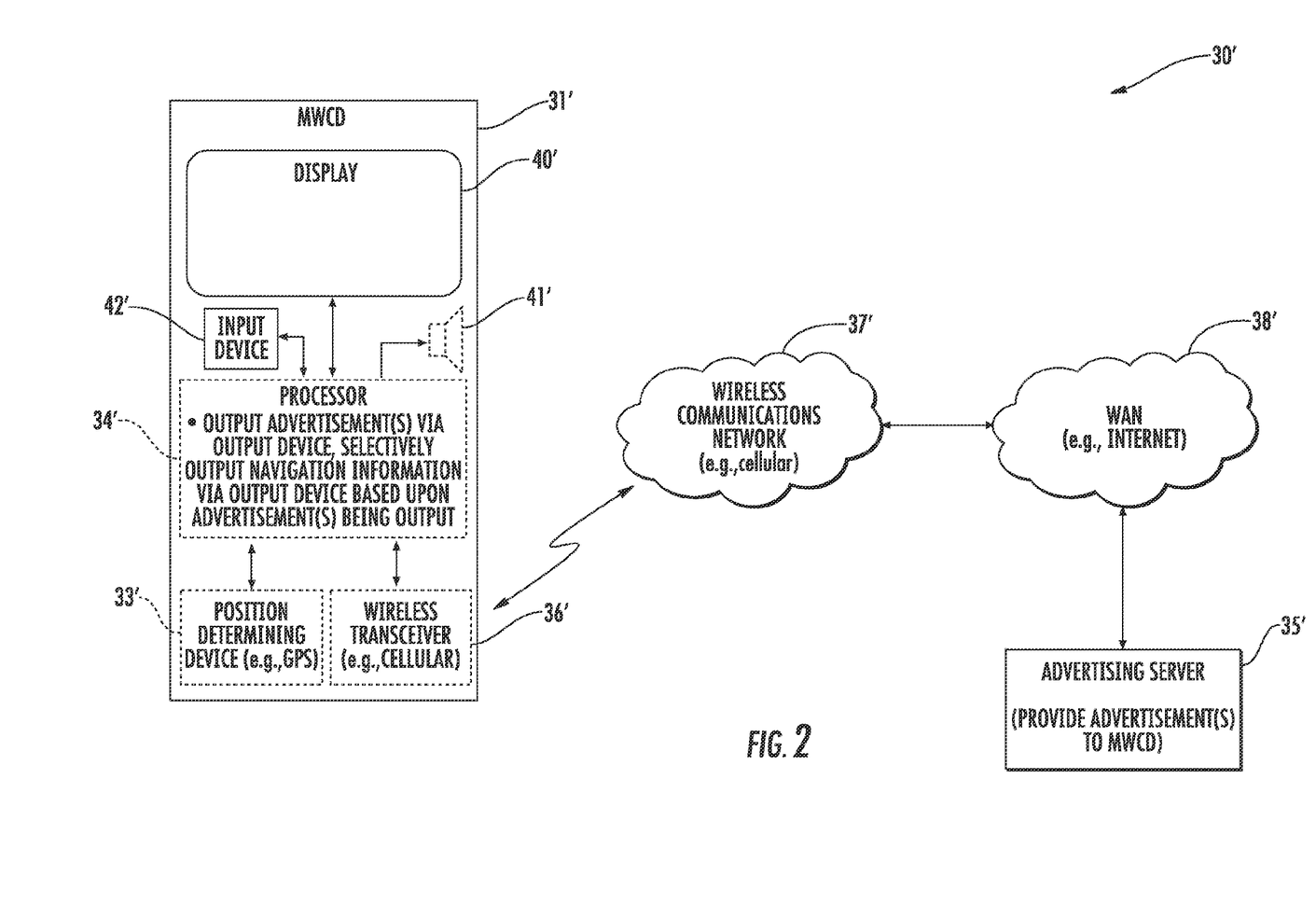
FIG. 2 is a schematic block diagram of an alternative embodiment of the system of FIG. 1.

Referring additionally to the alternative embodiment of the system 30' shown in FIG. 2, the mobile device 31' also illustratively includes a wireless transceiver 36' and associated antenna(s) (not shown), which may be an internal antenna(s), external antenna(s), or both. Moreover, the system 30' further illustratively includes a wireless communications network 37', and the advertising server 35' communicates with the mobile device 31' via the wireless communications network. More particularly, the advertising server 35' illustratively communicates with the wireless communications network 34 via a wide area network (WAN) 38', which in the present example is the Internet.

By way of example, the mobile device 31' and wireless communications network 37' may operate in accordance with a cellular, wireless LAN (e.g., 802.11x, Bluetooth, etc.), WiMAX, satellite, etc., communications format, as will be appreciated by those skilled in the art. In some embodiments, more than one such wireless communications format may be used in the same device (e.g., cellular, wireless LAN, and Bluetooth). Various types of mobile devices 31' may be used, such as mobile phones, PDAs, laptop computers, wireless-enabled cameras, wireless-enabled media players, etc., for example.

In the embodiment illustrated in FIG. 2, there are two different output devices, namely a display 40' and an audio output device 41' (e.g., a speaker). By way of example, the display 36 may be a liquid crystal display (LCD), although other suitable display types may also be used, as will be appreciated by those skilled in the art. The mobile device 31' also illustratively includes an input device 42'. Various types of input devices 42' may be used, such as a track ball, thumb wheel, directional (up, down, left, right, etc.) buttons, a sensory contact layer for a touch screen display, etc., as will also be appreciated by those skilled in the art.

By way of background, various cost models are used for providing navigation or map-based information to users. One approach is to provide such information for little or no fee to the user, but coupled with advertising to cover the cost. One example is the MapQuest® service, which provides Internet-based mapping in which sponsored links are displayed beside a map screen, which may be based upon the input address used for the map search. However, with such services the advertisements are typically located to the sides of the map screen, and therefore do not necessarily require that a user look at them. That is, with this advertising approach there is no assurance that the user has viewed the advertisements at all, and hence brand recall is not assured.

Another example is Tele Atlas BV of the Netherlands, a digital map data provider which offers branded point of interest (POI) markers for digital maps. The POI markers are essentially bitmaps displayed on POI markers on the map screen for sponsors. These visual brand depictions may be displayed as results in a specific POI search.

Another model for providing navigation information on mobile devices (e.g., cellular devices) is the fee-based approach. For example, with fee-based navigation services, the user pays a monthly charge of approximately $10-15. This includes the ability to specify a start and end point, and receive dynamic turn-by-turn driving instructions, possibly voice-enabled. The reason for the cost is that location-based services have become a revenue source for cellular carriers as they offer recurring and high-margin revenue streams. In many cases, the user finds that he or she pays for GPS hardware capability when purchasing his or her mobile device, but then finds that he/she cannot afford the "accompanying" navigation service, and may even be restricted from free mapping applications due to the adopted security model of the carrier which enforces subscriptions.

The system 30 and methods set forth herein may advantageously provide navigation services for mobile devices that is not based on a user subscription service, nor a pay-per-use model, but instead is an advertisement-based service that provides effective presentation of advertising with improved levels of user attention thereto. Referring now additionally to FIGS. 3-5B, beginning at Block 60, the processor 34 obtains one or more advertisements from the advertising server 35, at Block 61, and determines a current location of the mobile device 31 based upon the position determining device 33, at Block 62.

Various approaches may be used for obtaining the advertisements from the advertising server 35. For example, this may be done wirelessly, such as through the wireless (e.g., cellular) communications network 37' when a user first requests a route be calculated to a destination, as the mobile device 31' is traveling along a route, or both. Moreover, advertisements may also be downloaded "offline," for example, by connecting the mobile device 31' to a personal computer with Internet access via a USB port, etc., or by downloading advertising data to a removable memory card, or both. Moreover, downloading of advertisements may be performed on a push or pull basis (or both), meaning that initiation of advertisement downloading is controlled by the mobile device 31 or by the advertising server 35, as will be appreciated by those skilled in the art. That is, either the processor 34 or advertising server 35 (or both) may be programmed to download appropriate advertisements for the mobile device 31 at designated times, as will be discussed further below. For an offline implementation, the processor 34 may require new advertisements to be downloaded after a certain time period, a certain number of routes have been calculated, etc., to continue use of the navigation features.

Figure 4:
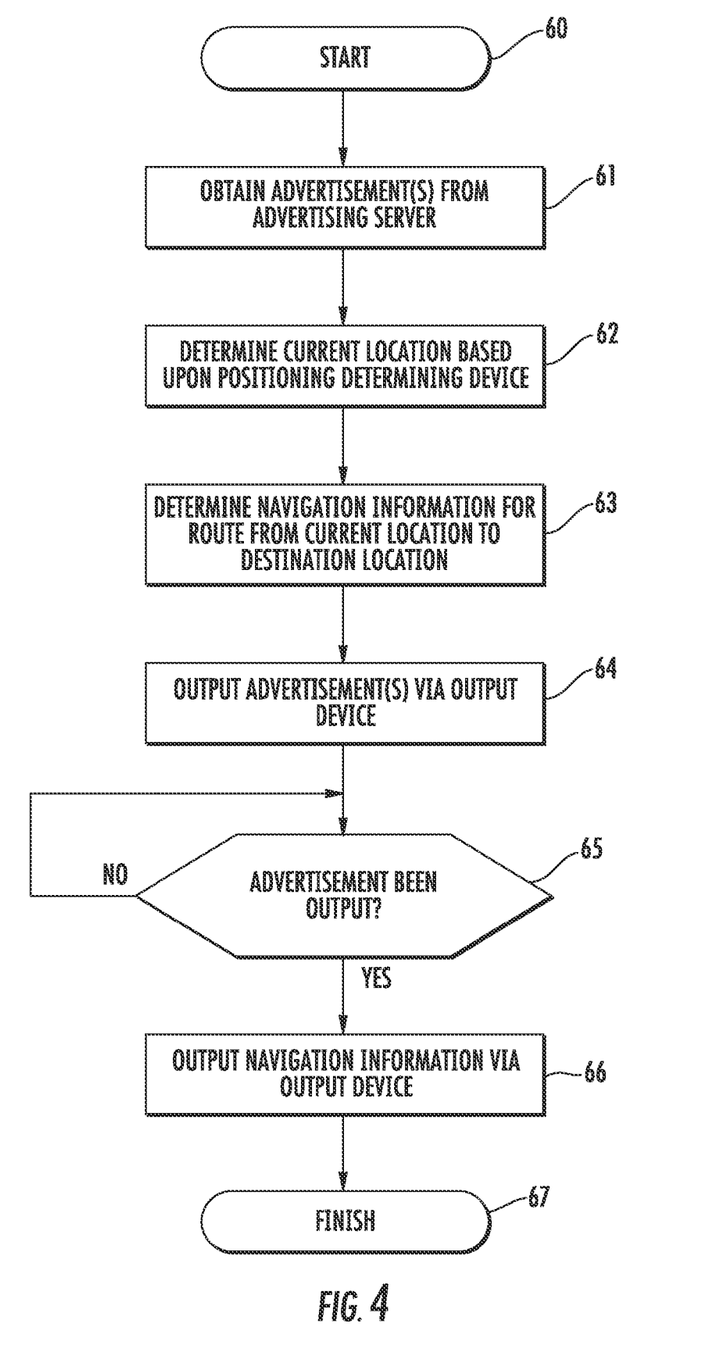
FIGS. 4, 5A, and 5B are flow diagrams illustrating method aspects for providing mobile advertising with a navigation application.

Navigation information for a route from the current location to a destination location may be determined, at Block 63.

This determination may be performed by the processor 34 or the advertising server 35 (or both), or some other navigation service (e.g., a third-party navigation server, for example). In accordance with one exemplary implementation, the processor 34 may perform the necessary calculations based upon road or map data associated with a navigation application to determine a route to the desired destination including directions, route markers, times, distances, etc., as will be appreciated by those skilled in the art.

Figure 5A:
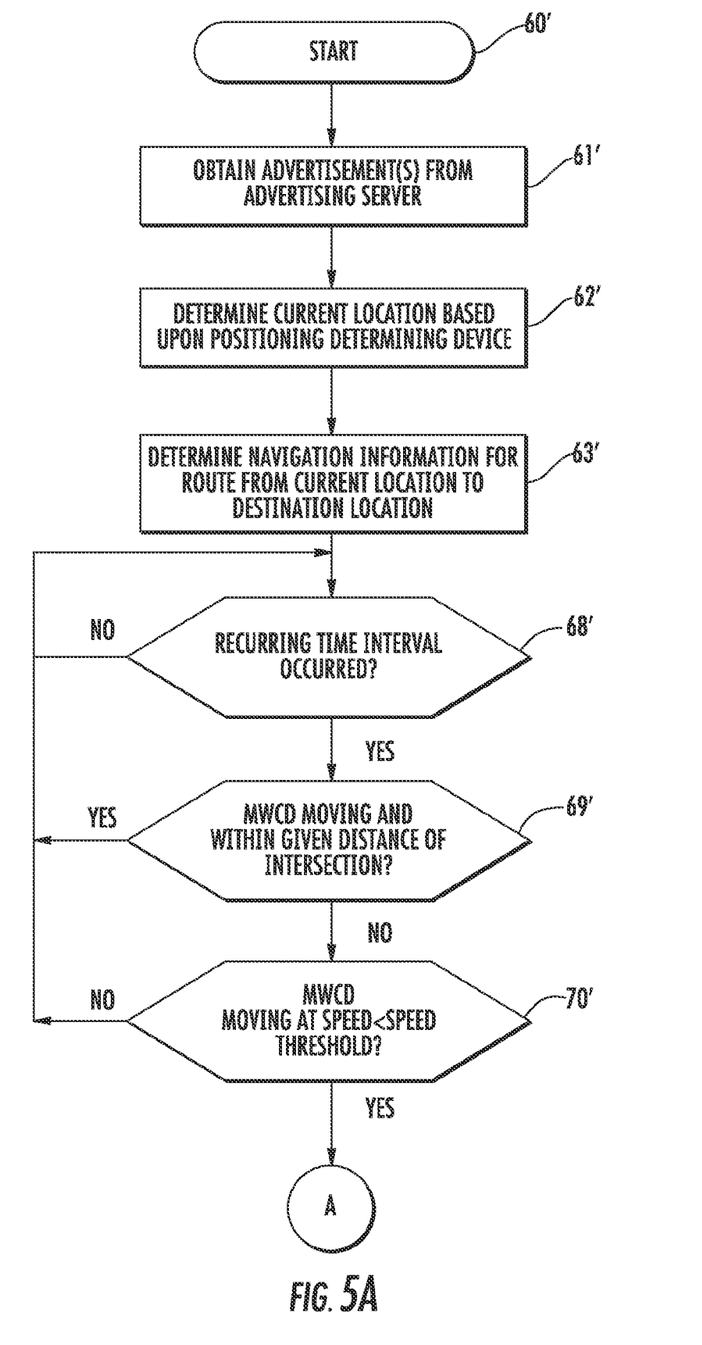
Figure 5B:
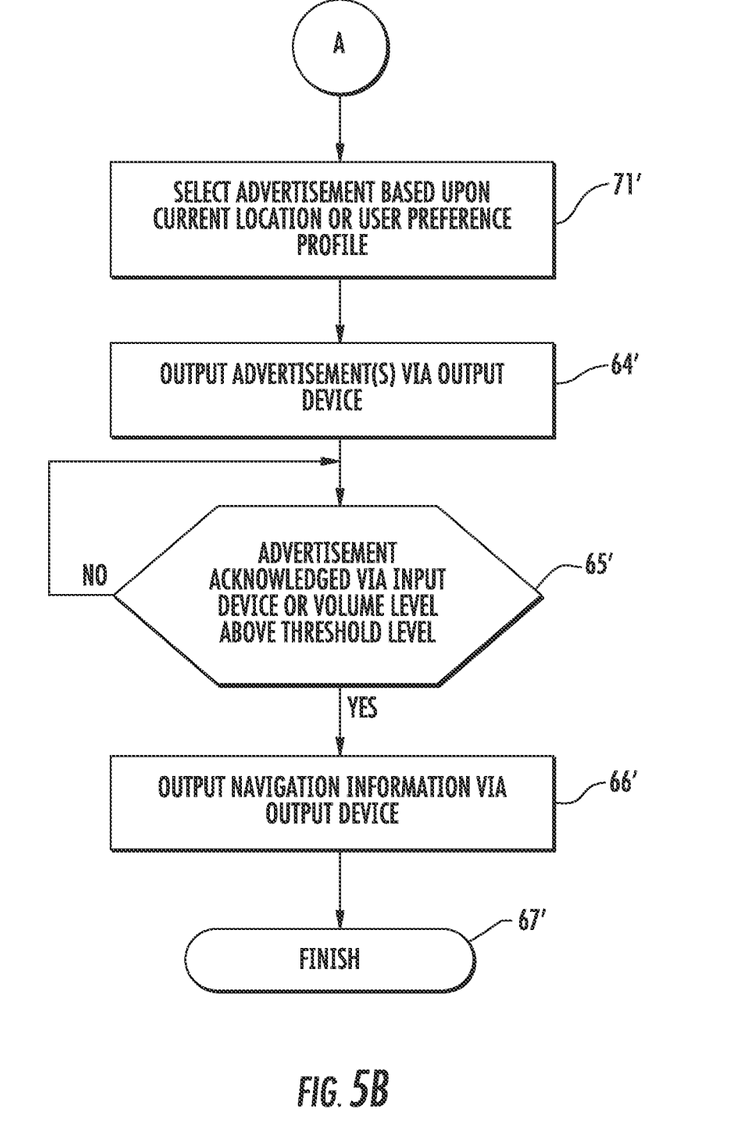

Furthermore, the processor 34 also outputs the advertisement(s) via the output device 32, and selectively outputs the navigation information via the output device based upon the advertisement(s) being output, at Blocks 64-66, thus concluding the method illustrated in FIG. 4 (Block 67). Outputting of the advertisements may take different forms in different embodiments. For example, the advertisements may be visual advertisements output on the display 40'. As such, the processor 34' may selectively output the navigation information based upon an acknowledgement of the advertisement provided via the input device 42', at Block 65' (FIG. 5B). That is, the user may be required to click an "OK" button, etc., on the display using the input device 42' acknowledging that the user has indeed observed the advertisement, prior to the processor 34' outputting the navigation information, which may be done on the display 40', audibly via the speaker 41', or both.

Another option is that the advertisement will be displayed for a certain period of time (e.g., five or more seconds) without the user being able to clear the display 40' before the navigation information is provided. Generally speaking, the interval over which the advertisement is to be displayed in such cases should be set for a reasonable amount of time to provide a significant likelihood that the user will in fact notice the advertisement, but yet not so long that it will be a significant annoyance to the user or interfere with the user's ability to obtain directions in a timely fashion. It should be noted that visual advertisements may be accompanied by audio advertising (or not) depending on the given embodiment (and vice-versa), and may be user-selectable in some embodiments. Moreover, advertisements may include video or animation in some embodiments, if desired.

Thus, in accordance with one example, a user may be subjected to targeted advertising via his or her mobile device 31, but the user will not incur any additional fees for navigation service usage. If the user requests driving directions to another location, then before displaying the list of directions, or the map containing the route markers, the user is required to view an advertisement on the display 40'. Again, the advertisements may be for businesses or events that are near the location of end point, or within proximity to the route, or both. In addition to using location as a filter for advertising, when signing up for the service, the user may be required to identify a certain number of point-of-interest (POI) categories, such as coffee houses and pubs, that will be used as filters for the ad results as part of the user's personal preference profile. To ensure viewing by the user, the user is required to dismiss or acknowledge the advertisement before the user is permitted to enter the navigation mode. Advertisements may be displayed at major waypoints of a longer route, and include local content based upon waypoint coordinates, for example. Moreover, the processor 34' may output advertisements at a recurring time interval (i.e., on a schedule), at Block 68'.

In some embodiments, the user may be subjected to advertising not only before navigation instructions are displayed, but also before the user's current position on a map is displayed as ascertained by GPS (or other location technology). This is in case the user is just following his or her position along on the map without having a specific route programmed. That is, providing basic location coordinates may also be regarded as a service that would require advertisement delivery. In addition, advertisements may not only be correlated with the user's current position or the route, but also with the current time, or the projected time at a destination waypoint (e.g. to serve up a time-limited coupon or make reference to an upcoming event for which tickets can be purchased).

Figure 3:
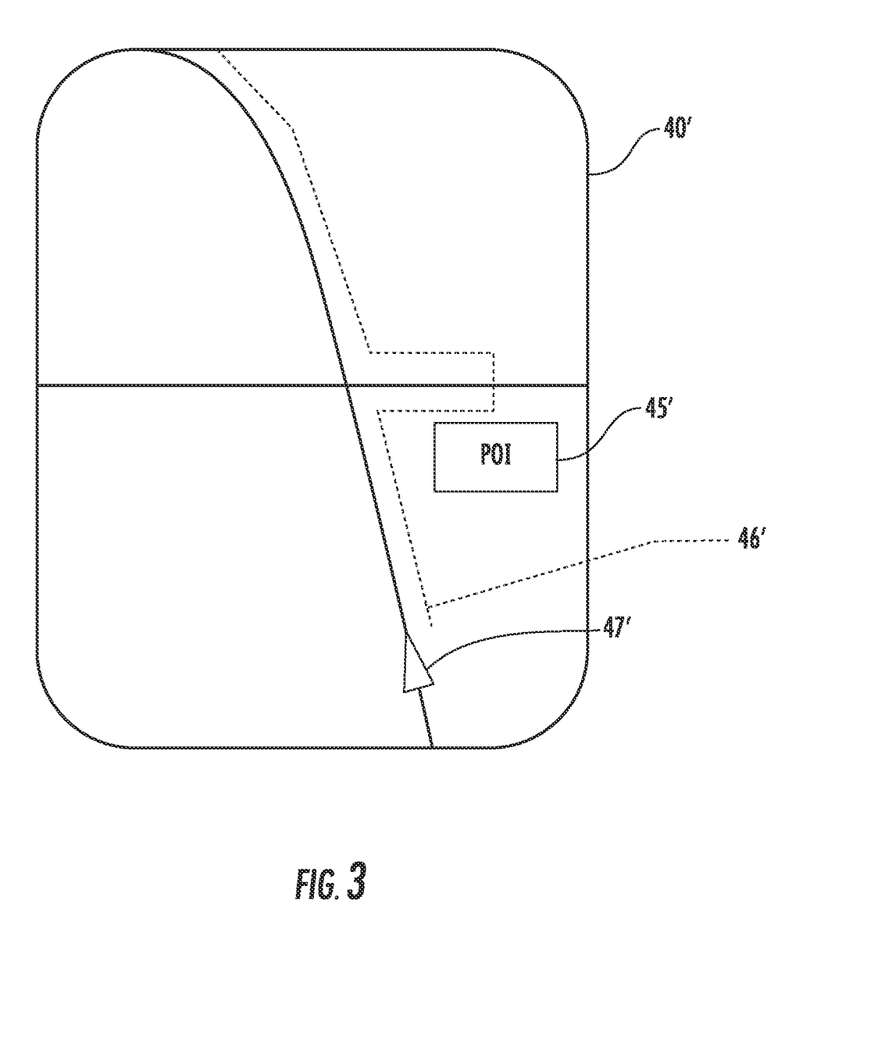
FIG. 3 is a front view of the display of the mobile wireless communications device of FIG. 2 in which displayed navigation information has been updated to include a location associated with an advertisement point-of-interest (POI).

In addition, the processor 34' may further display a POI icon 45' corresponding to a given advertisement on the display with the navigation information, as shown in FIG. 3. In the illustrated example, the location of the mobile device 31' is represented by a triangular icon 47'. As such, a user may advantageously select the POI icon 45' using the input device 42', indicating that the user wishes to "detour" from the current route to visit the POI. As such, the processor 34' may advantageously update the navigation information to include a location associated with the POI icon 45' based upon selection thereof. That is, the processor 34' may advantageously adjust or re-calculate a route 46' so that the route will include the POI, as shown.

By way of example, the user may be informed along a route that a restaurant has a special today only. The user may choose to ignore the advertisement (which may be visually depicted as a link on the map display, or announced by voice), or select it via the input device 42'. Upon selection, a waypoint to the destination will be inserted into the route (as a temporary detour). These advertisements may be strategically inserted along a long route (e.g., every hour) to invite the user to take a break from driving and take advantage of a sponsor's offer, for example. Again, the user may subscribe to various specials of interest when first using the application, and the distance between rest stops or gas station stops may be adjusted by the user or automatically calculated based on the route length and mileage, as will be appreciated by those skilled in the art. This technique allows the user to acknowledge the POI icon 45' and to optionally have it inserted directly into the route, which also provides for advertisement effectiveness tracking, as will further be appreciated by those skilled in the art. However, the POI need not be included in the route in all embodiments, and visual or audible (or both) directions may simply be provided telling the user when an advertisement POI is nearby.

In some embodiments, the advertisement may be an audio advertisement to be played on the speaker 41', and the navigation information may include audio navigation information, such as spoken words to indicate when a turn is required, for example, as will be appreciated by those skilled in the art. In such a configuration, the user may not be looking at the display 40' (or there may be no display, or the display may not be used for navigation). Thus, to increase the likelihood that the user will in fact listen to the advertisement, the processor 34' may perform various operations. One approach is to output the audio navigation information via the speaker 41' based upon audio advertisements being output at a volume level above a threshold level, at Block 65'. That is, the processor 34' may require the user to have the volume of the mobile device 31' set to a given threshold volume so that the advertisement is being played at a volume level sufficient to be heard by the user. Moreover, the threshold volume level may be changed, such as based upon a speed at which the mobile device 31' is traveling, etc. The user may also have the option to pause an advertisement in some embodiments, in which case the processor 34' may allow navigation information to be displayed for a short time, but then discontinue the navigation information until the advertisement playback is resumed.

In some embodiments, playback of advertisements may also be interrupted automatically by the system such that navigation instructions may be heard (e.g., when the user veers off course unexpectedly during the middle of an advertisement). The advertisement may be replayed at a later time. Another option is that the advertisement may simply be paused for the duration of the instructions.

In accordance with one exemplary audio navigation information embodiment, a pre-recorded advertisement message may be played while the mobile device 31' is in a user-selectable voice-based navigation mode (e.g., where turn instructions are being announced). If the length of the advertisement (e.g., such advertisements are often produced in fifteen, thirty, or sixty second intervals) can fit within the time required to travel between two turns, then the advertisement may be played to the user. Again, the product/service being advertised may be selected by mining the user's destination address, POI categories of interest, user preference profile, previous searches, etc.

In this way, the user will be required to listen to advertisements while in the audible navigation mode. The advertisement may also be played back along shorter routes if a high traffic condition is detected (i.e. through a traffic information service, or by detected prolonged or slow movement along the road, using the position determining device 33'). Thus, when the mobile device 31' is stationary or moving at a speed less than a speed threshold (indicating the user is stopped or in traffic), at Block 70', advertisements may generally be presented to the user in a safer manner. That is, if the mobile device 31' is moving and is within a given distance of an intersection (including road crossings, highway exits, etc.), the user may be more likely in need of the navigational information to ensure that he or she is taking the correct turn or exit. As such, playing or displaying an advertisement at such time could cause a distraction if the user is driving that in turn may result in an accident. However, it should be noted that the advertisement information may also be displayed while the mobile device 31' is traveling at highway speeds as well in some embodiments, and need not be displayed only when traveling slowly or at a standstill.

In addition to selecting advertisements to download based upon the location, user preference profile, etc., the actual advertisements to be displayed may be selected based upon this information as well. That is, a number of advertisements may be downloaded corresponding to different locations, advertisement types, etc., and the processor 34' may advantageously select which of these advertisements are appropriate based upon the current location, user preference profile, etc.

A related computer-readable medium may have computer-executable instructions (or modules) for causing a mobile device 31 to perform steps including obtaining at least one advertisement from an advertising server 35, determining a current location based upon its position determining device 33, and determining navigation information for a route from the current location to a destination location. The steps may further include outputting at least one advertisement via the output device 32, and selectively outputting the navigation information via the output device based upon the advertisement(s) being output, as discussed further above.

Exemplary components of a mobile wireless communications device 1000 that may be used in accordance with the system 30 are further described in the example below with reference to FIG. 6. The device 1000 illustratively includes a housing 1200, a key pad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the key pad 1400 and the display 1600. The processing device 1800 controls the operation of the display 1600, as well as the overall operation of the mobile device 1000, in response to actuation of keys on the key pad 1400 by the user. In some embodiments, key pad 1400 may comprise a physical key pad or a virtual key pad (e.g., using a touch-sensitive interface) or both.

The housing 1200 may be elongated vertically, or may take on other sizes and shapes (including clamshell housing structures). The key pad 1400 may include a mode selection key, or other hardware or software for switching between text entry and telephony entry.

Figure 6:
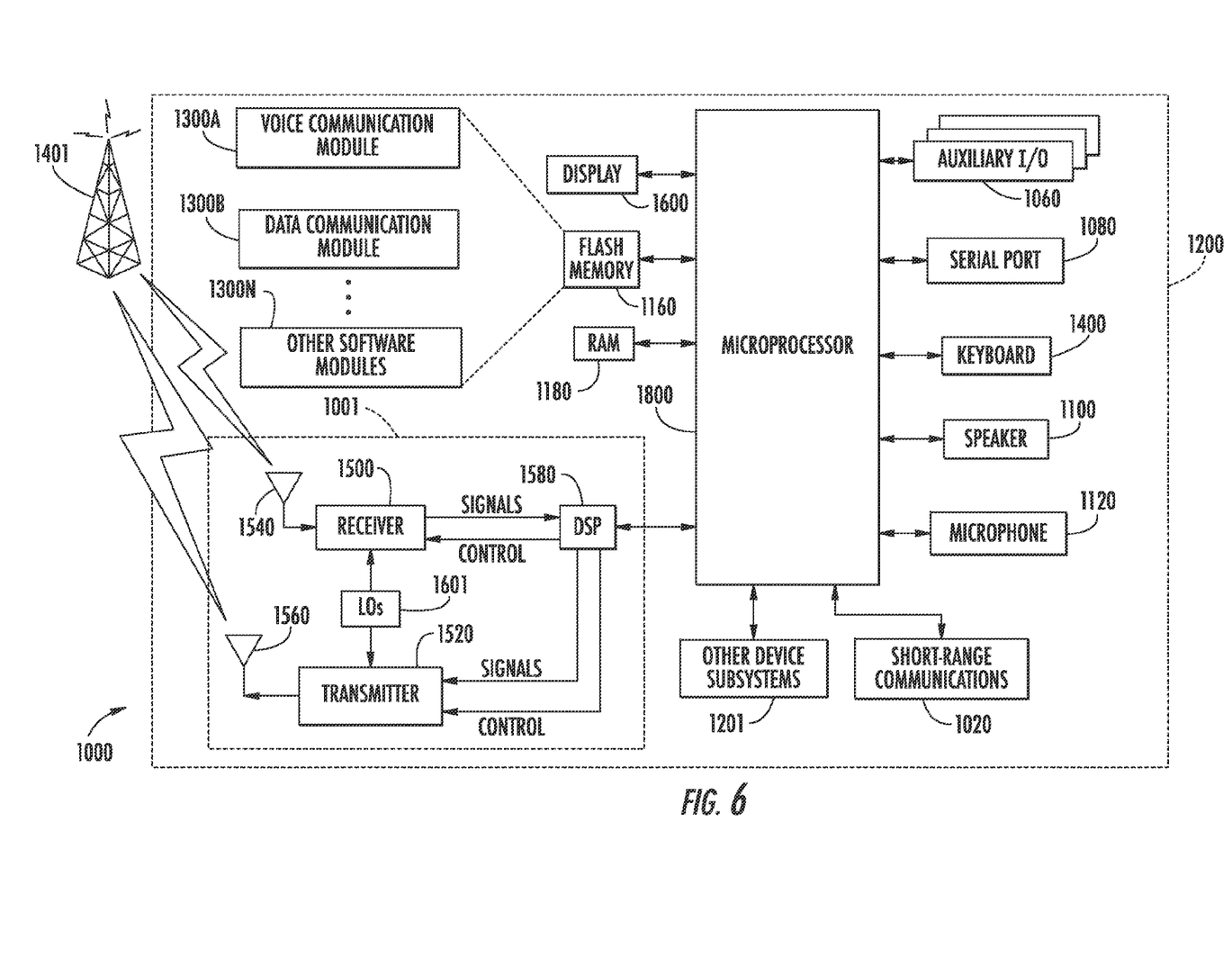
FIG. 6 is a schematic block diagram illustrating exemplary components of a mobile wireless communications device that may be used in accordance with the system of FIG. 1.

In addition to the processing device 1800, other parts of the mobile device 1000 are shown schematically in FIG. 6. These include a communications subsystem 1001; a short-range communications subsystem 1020; the key pad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the key pad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
a notification server; and
at least one mobile wireless communications device comprising:
an output device,
a position determining device, and
memory storing program instructions, that when executed by a processor, cause the mobile wireless communications device to:
determine a current location by the position determining device;
obtain at least one notification comprising data representative of at least one advertisement from the notification server based upon at least one location of the mobile wireless communications device;
output the at least one advertisement via the output device; and
selectively output navigation information via the output device for a route from the current location to a destination location associated with the advertisement responsive to user input.

2. The wireless communications system of claim 1 wherein the output device comprises a display.

3. The wireless communications system of claim 2 wherein the processor further displays a point-of-interest (POI) icon corresponding to the at least one advertisement on the display with the navigation information.

4. The wireless communications system of claim 3 wherein the at least one mobile wireless communications device comprises an input device; wherein the POI icon is selectable based upon the input device; and wherein the processor updates the navigation information to include a location associated with the POI icon based upon selection thereof.

5. The wireless communications system of claim 1 wherein the at least one mobile wireless communications device comprises an input device; and wherein the processor selectively outputs the navigation information based upon an acknowledgement via the input device of the at least one advertisement.

6. The wireless communications system of claim 5 wherein the processor outputs the at least one advertisement at a recurring time interval for acknowledgement.

7. The wireless communications system of claim 1 wherein the output device comprises an audio output device.

8. The wireless communications system of claim 7 wherein the navigation information comprises audio navigation information, and the at least one advertisement comprises at least one audio notification; and wherein the processor selectively outputs the audio navigation information via the audio output device based upon the at least one audio notification being output at a volume level above a threshold level.

9. The wireless communications system of claim 1 wherein the at least one notification comprises a plurality of different advertisements; and wherein at least one of the notification server and the processor selects the advertisements based upon the current location.

10. The wireless communications system of claim 1 wherein the at least one notification comprises a plurality of different advertisements; and wherein at least one of the notification server and the processor selects the notifications based upon a user preference profile associated with the at least one mobile wireless communications device.

11. The wireless communications system of claim 1 wherein the navigation information includes road intersection information; and wherein the processor does not output the at least one advertisement while the at least one mobile wireless communications device is moving and within a given distance of an intersection.

12. The wireless communications system of claim 1 wherein the processor outputs the at least one notification on the display while the at least one mobile wireless communications device is moving at a speed below a speed threshold.

13. A mobile wireless communications device comprising:
an output device;
a position determining device; and
memory storing program instructions that when executed by a processor cause the mobile wireless communications device to:
determine a current location by the position determining device;
obtain at least one notification comprising data representative of at least one advertisement from a notification server based upon at least one location of the mobile wireless communications device;
output the at least one advertisement via the output device; and
selectively output navigation information via the output device for a route from the current location to a destination location associated with the at least one advertisement responsive to user input.

14. The mobile wireless communications device of claim 13 wherein the output device comprises a display.

15. The mobile wireless communications device of claim 13 further comprising an input device; and wherein the processor selectively outputs the navigation information based upon an acknowledgement of the at least one advertisement.

16. The mobile wireless communications device of claim 13 wherein the output device comprises an audio output device.

17. A method, comprising:
determining a current location of at least one mobile wireless communications device by a position determining device;
receiving at least one notification comprising data representative of at least one advertisement from a notification server by the at least one mobile wireless communications device based upon at least one location of the mobile wireless communications device;
outputting the at least one advertisement via an output device; and
selectively outputting navigation information via the output device for a route from the current location to a destination location associated with the at least one advertisement responsive to user input.

18. The method of claim 17 wherein the output device comprises a display.

19. The method of claim 17 wherein the at least one mobile wireless communications device further comprises an input device; and wherein selectively outputting the navigation information is based upon user acknowledgement via the input device of the at least one advertisement.

20. The method of claim 17 wherein the output device comprises an audio output device; and wherein the navigation information comprises audio navigation information and the at least one notification comprises at least one audio notification.

21. A non-transitory computer-readable medium having computer-executable instructions for causing a wireless communications device including an output device, an input device, and a position determining device, to perform steps comprising:
determining a current location by the position determining device;
receiving at least one notification comprising data representative of at least one advertisement from a notification server based upon at least one location of the mobile wireless communications device;
outputting the at least one advertisement via the output device; and
selectively outputting navigation information via the output device for a route from the current location to a destination location associated with the at least one advertisement responsive to user input.

22. The computer-readable medium of claim 21 wherein the output device comprises a display.

23. The computer-readable medium of claim 21 wherein selectively outputting the navigation information is based upon user acknowledgement of the at least one advertisement.

24. The computer-readable medium of claim 21 wherein the output device comprises an audio output device; and wherein the navigation information comprises audio navigation information and the at least one advertisement output via the output device comprises at least one audio advertisement.

* * * * *